United States Patent [19]

Takei et al.

[11] Patent Number: 4,508,752

[45] Date of Patent: Apr. 2, 1985

[54] METHOD FOR MANUFACTURING A MAGNETIC RECORDING MEDIUM

[75] Inventors: Yutaka Takei; Masashi Somezawa, both of Sendai, Japan

[73] Assignee: Sony Corporation, Tokyo, Japan

[21] Appl. No.: 634,183

[22] PCT Filed: May 28, 1982

[86] PCT No.: PCT/JP82/00209

§ 371 Date: Jan. 28, 1983

§ 102(e) Date: Jan. 28, 1983

[87] PCT Pub. No.: WO82/04343

PCT Pub. Date: Dec. 9, 1982

Related U.S. Application Data

[63] Continuation of Ser. No. 464,496, Jan. 28, 1983, abandoned.

[30] Foreign Application Priority Data

May 28, 1981 [JP] Japan ................................ 56-81296

[51] Int. Cl.$^3$ .................... H01F 10/00; B05D 5/12
[52] U.S. Cl. .................................... 427/48; 427/128; 427/130
[58] Field of Search .................... 427/48, 128, 130

[56] References Cited

U.S. PATENT DOCUMENTS

| | | | |
|---|---|---|---|
| 3,001,891 | 9/1961 | Stoller | 117/93 |
| 4,200,680 | 4/1980 | Sasazawa et al. | 427/48 |
| 4,332,834 | 1/1982 | Takei | 427/48 |

Primary Examiner—Bernard D. Pianalto
Attorney, Agent, or Firm—Hill, Van Santen, Steadman & Simpson

[57] ABSTRACT

A method for manufacturing a magnetic recording medium of the invention, comprises the steps of coating a magnetic paint consisting mainly of a needle-like magnetic powder and a binder on a nonmagnetic support to form a coating film; applying a DC magnetic field of a predetermined direction obtained with a superconductive solenoid magnet to the coating film in which the needle-like magnetic powder is still mobile, thereby orienting the needle-like magnetic powder in the predetermined direction; and drying the coating film.

In a magnetic tape prepared by this method, a residual magnetic flux density is improved by about 10 to about 20% over the conventional tape, and tape the sensitivity and output are significantly improved. Since only a permanent current need be flown through a superconductive wire having a substantially zero electric resistance, power loss due to heat generation may be eliminated. Running cost of a cooling device or the like may be significantly reduced, so that the method of the present invention is also advantageous from the view point of energy conservation.

5 Claims, 6 Drawing Figures

METHOD FOR MANUFACTURING A MAGNETIC RECORDING MEDIUM

This is a continuation of application Ser. No. 464,496, filed Jan. 28, 1983, now abandoned.

TECHNICAL FIELD

The present invention relates to a method for manufacturing a magnetic recording medium and, more particularly, to a method for manufacturing a magnetic recording medium with which the magnetic field orientation treatment may be performed effectively.

BACKGROUND ART

In the manufacture of a magnetic recording medium such as magnetic tape, a magnetic paint is coated on a nonmagnetic support such as a nonmagnetic polymeric film and the magnetic field orientation treatment is performed in order to improve magnetic characteristics of magnetic substance of a magnetic layer in a particular direction. According to a conventional method for manufacturing a magnetic recording medium, needle-like magnetic particles are dispersed in a binder to prepare a magnetic paint. The resultant magnetic paint is coated on a nonmagnetic support to a predetermined thickness. While the magnetic particles in the coating film are still mobile, that is, while the coating film is still not dry, the film is passed through a magnetic field so that the magnetic particles are oriented along the direction of the magnetic field, thus completing the magnetic orientation treatment. By performing the orientation treatment, the squareness ratio (Rs) of the magnetic recording medium is increased to improve sensitivity.

With recent demand for higher recording density, a higher S/N ratio is required. For this reason, finer magnetic particles are desired. As a result, when such fine magnetic particles are used, it is difficult to achieve sufficient orientation with the conventional magnetic field orientation treatment. When the size of the magnetic particles decreases, the magnetic moment of the individual magnetic particles is also decreased. As a result of this, the torque which acts on the particle is weakened to interfere with orientation. Furthermore, when the magnetic particles become smaller in size, the specific surface area increases. Therefore, the viscosity resistance against the movement of the magnetic particles in the magnetic paint increases to render orientation difficult.

Although fine alloy powders which have great magnetic moments are also recently used for manufacturing magnetic recording media, they tend to easily cohere magnetically to significantly impair orientation. Satisfactory orientation may not be expected with such fine alloy powders when a conventional orientation treatment is performed.

A permanent magnet or a DC electromagnet is used in the conventional orientation treatment. According to such a method, the degree of orientation is not much improved even if an applied magnetic field is intensified in an attempt to improve the degree of orientation of the magnetic particles in the magnetic layer. When the magnetic field is intensified exceeding a predetermined level, the smoothness of the surface of the magnetic film is impaired. Various methods have been proposed in order to improve such a orientation treatment method. For example, Japanese Patent publication No. 49-30722 proposes an orientation treatment method in which an auxiliary magnetic field generator for superposing an AC auxiliary magnetic field on the main magnetic field is arranged in the vicinity of a main orientation device using a permanent magnet or a DC electromagnet. Japanese Patent Publication No. 54-98205 proposes a method for facilitating orientation of magnetic particles by superposing an AC magnetic field or mechanical vibrations perpendicularly to the direction of the main orientation of a DC magnetic field. However, these methods do not increase the rotational torque for moving the magnetic particles but only serve to help the movement of the magnetic particles in a main orienting magnetic field.

According to the conventional methods including the well-known methods described above, the intensity of a magnetic field available is 2 KOe and is about 3 KOe at maximum. Even if fine particles are used as magnetic particles, the intensity of a magnetic field which can supply a sufficient rotational torque is as high as about 5 kOe. A magnetic field of a still higher intensity is required if alloy-type ultra fine particles are used as magnetic particles. Even if magnetic particles of oxide type are used, a magnetic field of a higher intensity is required to disperse the magnetic particles if the viscosity of a viscous medium such as a binder to be used is high. Therefore, with the conventional method, the intensity of the magnetic field for providing a rotational torque necessary to satisfactorily orient the magnetic particles is not sufficient. Even if the intensity of a magnetic field is to be made higher, the magnetic material such as a permanent magnet used is limited and a magnetic field of about 3 kOe or higher cannot be generated.

The conventional method is subject to another problem: a magnetic field application time to provide a rotational torque necessary to rotate the magnetic particles is short. In the conventional method, if the speed of the magnetic tape during the orientation treatment is 100 m/min and the gap for generating magnetic flux is 1 cm, the magnetic field application time is as short as 6 msec. In contrast to this, the magnetic field application time required to complete satisfactory orientation of the magnetic particles is about 1,000 msec if the intensity of the magnetic field is about 2 kOe and the viscosity of the viscous medium is low, and is about 5,000 msec if the intensity of the magnetic field is about 2 kOe and the viscosity of the viscous medium is high. Thus, the magnetic field application time is too short. Even if an attempt is made to elongate the magnetic field application time, it is almost impossible to do so in principle except for making the gap passing speed of the magnetic tape very slow since the magnetic flux from the narrow gap in the magnetic circuit is utilized. If the speed of the magnetic tape during orientation is made very slow for this purpose, the productivity of the medium is lowered to make the manufacture thereof impractical. Thus, the magnetic field application time in the conventional method is far too short for satisfactorily orientating the magnetic particles, resulting in quite unsatisfactory orientation of the magnetic tape.

DISCLOSURE OF INVENTION

It is an object of the present invention to provide a method for manufacturing a magnetic recording medium which eliminates the problems of the conventional methods. According to the method of the present invention, a rotational torque strong enough to rotate needle-like magnetic particles in a viscous medium can be applied to the magnetic particles, and such a rotational torque can be maintained for a time necessary to satisfactorily complete orientation of the magnetic particles, thus providing a magnetic recording medium in which the magnetic particles are satisfactorily oriented in a predetermined direction.

A method for manufacturing a magnetic recording medium according to the present invention, comprises the steps of coating a magnetic paint consisting mainly of a needle-like magnetic powder and a binder on a nonmagnetic support to form a coating film; applying a DC magnetic field of a predetermined direction obtained with a superconductive solenoid magnet on said coating film in which said needle-like magnetic powder is still mobile, thereby orienting said needle-like magnetic powder in said predetermined direction; and drying said coating film.

Superconductivity at super low temperatures which is adopted in the present invention is being studied much in big projects for MHD power generation, nuclear fusion, high-speed linear cars and the like as a key to practical use. Fine application techniques of superconductivity are also being developed in various measurement techniques such as computer components or sensors as an application of Josephson effect. However, superconductivity at super low temperatures has not been applied to any manufacturing process since the technique for eliminating consumption of liquid helium which determines the running cost which is important in the manufacturing process has not been developed yet, and the technique for obtaining inexpensive superconductive magnet has not been established yet.

However, according to the method of the present invention, a superconductive magnet, that is, a superconductive solenoid magnet, is developed which may be used for the orientation treatment of a magnetic recording medium such as magnetic tape. Conventionally, a superconductive magnet is generally used in an intense magnetic field of 10 T or higher. However, according to the present invention, a superconductive magnet can continuously generate a magnetic field of about 1.5 T or less for a predetermined period of time, so that orientation of the magnetic recording medium may be effectively performed. A superconductive magnet developed for the purpose of the present invention can provide a performance which may not be achieved with any conventional magnet and may be applied to a manufacturing process which has hitherto been impossible.

BEST MODE OF CARRYING OUT THE INVENTION

Figure 1:
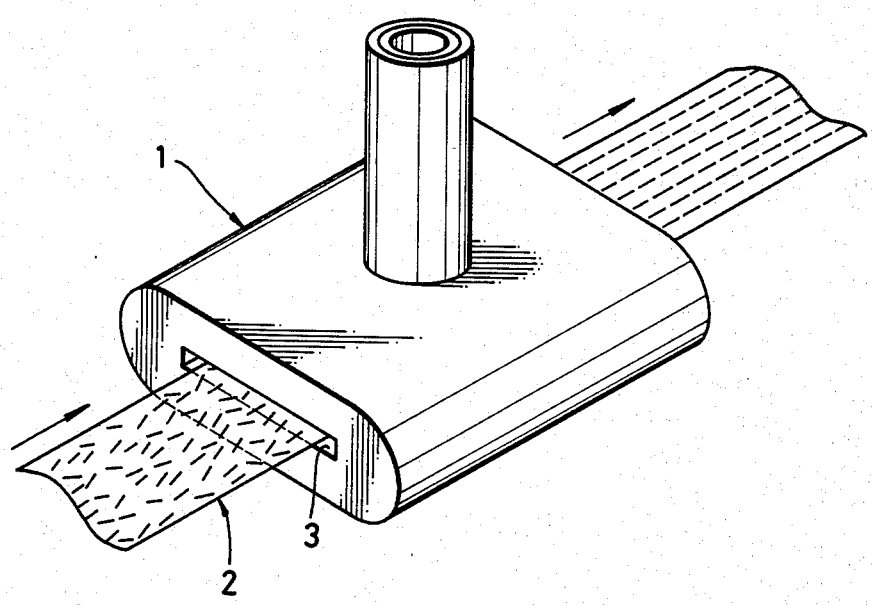
FIG. 1 is a perspective view showing the state in which a magnetic tape is running in a superconductive solenoid magnet used in the method of the present invention.

The orientation treatment method which is the characteristic feature of the method of the present invention will first be described. As shown in FIG. 1, orientation of a magnetic tape, for example, is performed by passing an unoriented magnetic tape 2 through a superconductive solenoid magnet 1 in the direction of the arrow. While the magnetic tape 2 passes through the magnetic field applied in the gap formed in the superconductive solenoid 1, the magnetic particles of the magnetic layer of the magnetic tape 2 are oriented in a predetermined direction by a DC magnetic field applied parallel to the orienting direction by the superconductive solenoid magnet 1.

In order to satisfactorily orient the magnetic particles in a magnetic recording medium, a magnetic field is applied which is intense enough to provide a rotational torque which is strong enough to rotate the magnetic particles in a viscous medium such as a binder. Such a rotational torque must be continuously applied for a predetermined period of time to allow complete orientation of the magnetic particles. Although it differs depending upon the type of the needle-like magnetic particles used, the intensity of the magnetic field to be applied in the present invention is generally about 1.5 to about 15 kOe. If the magnetic particles are fine particles, examples of which may include iron oxides such as $\gamma$-$Fe_2O_3$, $Fe_3O_4$ or an intermediate iron oxide therebetween; iron oxides such as Co-containing $\gamma$-$Fe_2O_3$, Co-containing $Fe_3O_4$, or an intermediate iron oxide therebetween; or oxides such as $CrO_2$ or a mixture thereof with one or more of metal elements selected from Te, Sb, Fe, Bi and the like, and which have a specific surface area of about 10 to about 30 $m^2$/g, the intensity of a magnetic field is preferably about 1.5 to about 8 kOe and is more preferably about 3.5 to about 8 KOe. On the other hand, if the needle-like magnetic particles are ultra fine particles, examples of which may include metals such as Fe, Co and Ni; alloys such as Fe-Ni, Fe-Co, Fe-Co-Ni, Fe-Co-B, and Fe-P; or mixtures thereof with low magnetic metals such as Cr or Al and which have a specific surface area of about 30 to about 120 $m^2$/g, the intensity of a magnetic field to be applied is preferably about 3 to about 15 KOe and is more preferably about 5 to about 10 kOe.

The orienting magnetic field application time differs depending upon the intensity of the magnetic field and/or the viscosity of the viscous medium. However, the magnetic field application time is generally about 100 msec or longer and is preferably about 150 msec or longer. In general, the more the magnetic field is intensified, the shorter the application time becomes. However, a superconductive magnet used in the present invention can provide an orienting magnetic field and an application time thereof which is sufficient to complete orientation irrespective of the type of the needle-like magnetic particles and the degree of difficulty of orientation of the magnetic particles due to the difference in the viscosity in various viscous media. In order to complete orientation of the magnetic particles, as has been described earlier, an application time of a magnetic field of 2 kOe is about 1,000 msec if the viscosity of a viscous medium used is small and is about 5,000 msec if the viscosity is great. An application time of a magnetic field of 3 kOe is short; about 200 msec and about 1,000 msec, respectively in the two cases described above.

The superconductive magnet used in the present invention can provide a magnetic field application time long enough to allow satisfactory orientation of the magnetic particles under an orienting magnetic field of such a low intensity. As has been described above, if the orienting magnetic field is intensified, the application time thereof may be shortened. In this case, the superconductive magnet of the present invention can provide an orienting magnetic field application time which is long enough. The orienting magnetic field application time may be adjusted by varying the length of the solenoid of the superconductive magnet used and/or the driving speed of the magnetic tape being oriented.

The structure of a superconductive magnet, that is, a superconductive solenoid magnet which is used in the present invention will now be described.

Figure 2:
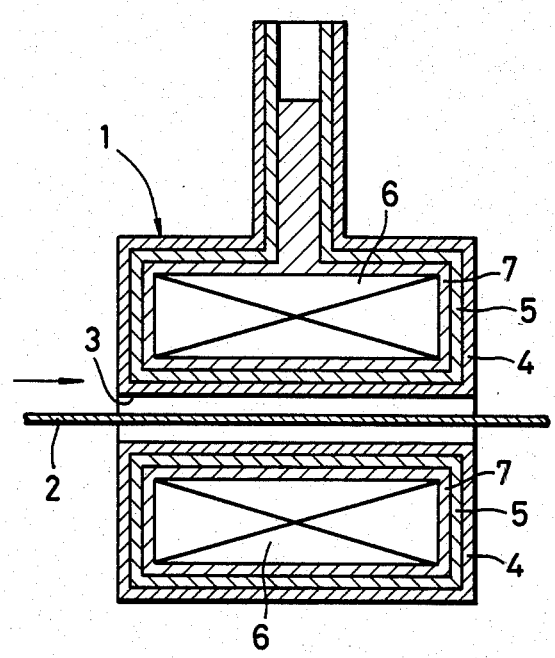
FIGS. 2 and 3 are sectional views showing examples of the magnet used in the present invention.
Figure 3:
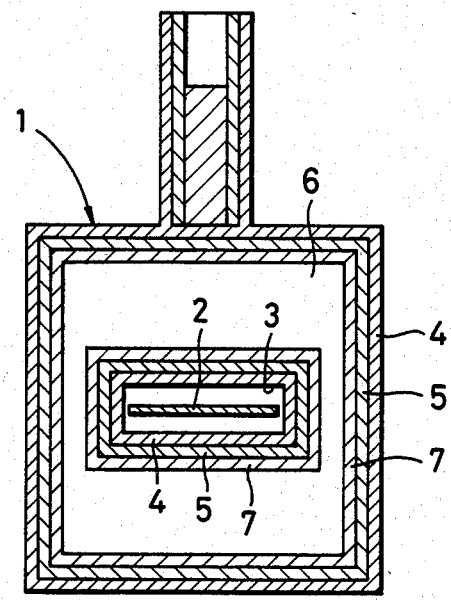

Referring to FIGS. 2 and 3, the superconductive magnet 1 has a slit 3 to allow passage of a magnetic recording medium such as the magnetic tape 2 at its center. A vacuum layer 4 as a heat-insulating layer is formed to define this slit and to surround the outer surface of the magnet. A superinsulating layer 5 of a substance which has an extremely small thermal conductivity such as a structure obtained by depositing a metal on a mica sheet is formed inside the vacuum layer. A solenoid 6 constituting the superconductive solenoid magnet is formed inside the superinsulating layer 5 such that uniform parallel magnetic field be applied on the entire surface of the magnetic tape 2 passed inside the slit 3 formed at the center of the magnet. The coil of the solenoid 6 comprises a superconductive wire which has a substantially zero electric resistance, and an example of which is a multifilament of a material such as Nb-Ti. The solenoid is submerged in a liquid helium at, for example, 4.2° K. With a superconductive magnet of the structure as described above, the depth of the slit 3 or the like may be varied in accordance with the speed of the magnetic tape 2 or the like. The dimensions of this slit 3 are so selected that the length/width ratio thereof is about 1/10 or less. The magnetic field distribution in the slit is preferably uniform, and the ratio of the intensity at the end of transverse direction to that at the central portion is preferably about 1.2 or less. A device (not shown) for converting a gaseous helium into liquid helium may be connected to the solenoid.

A superconductive solenoid magnet of the structure as described above and used in the present invention can produce a DC magnetic field of up to about 1.5 T.

The present invention will now be described by way of its examples.

EXAMPLE 1

The orientation treatment to be described below was performed using a supercoductive solenoid magnet having the schematic structure as shown in FIGS. 1 to 3.

In order to perform this orientation treatment, a magnetic paint composition of the components shown below was prepared:

| Composition | Parts by Weight |
| --- | --- |
| Fe-Ni alloy powder (magnetic ultra fine particles, 40 m²/g specific surface area, Hc = 1,200 Oe) | 100 |
| Vinyl chloride-vinyl acetate co-polymer (Trade name: "VAGH") | 15.0 |
| Polyurethane resin (Trade name: "Estan 5702") | 15.0 |

-continued

| Composition | Parts by Weight |
| --- | --- |
| Lecithin | 1.0 |
| Methyl ethyl ketone | 150 |
| Methyl isobutyl ketone | 150 |

After the paint composition as described above was kneaded, it was coated on one surface of a polyethylene terephthalate film at a coating speed of 100 m/min according to the conventional method. Before the coating film was dry and after the coating step was completed, the coating film was passed at the same speed as the coating speed through a slit formed at the center of the superconductive solenoid magnet and having dimensions of 20 mm (length)×300 mm (width)×500 mm (depth).

Figure 4:
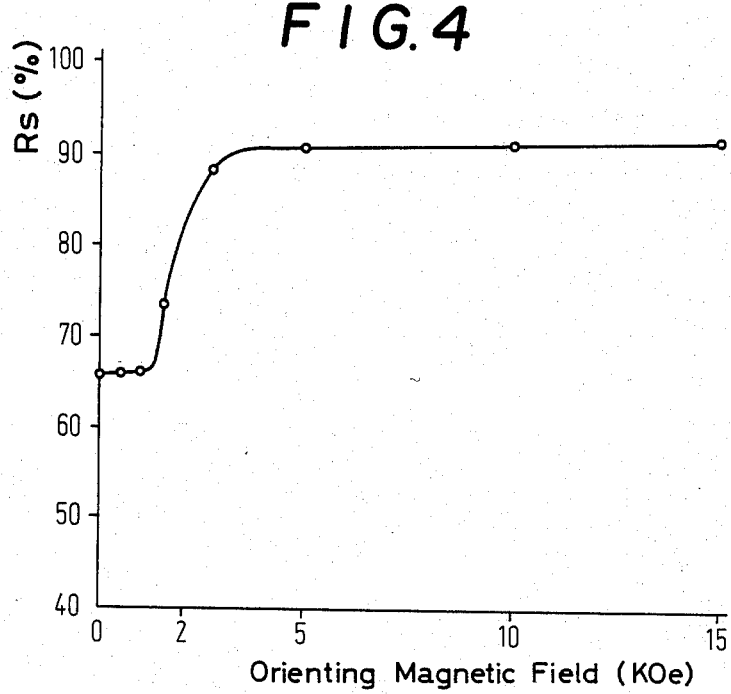
FIG. 4 is a graph showing the squareness ratio as a function of the intensity of an orienting magnetic field of a magnetic tape obtained in Example 1.

Changes in the squareness ratio (Rs) were measured by varying the intensity of the orienting magnetic field. FIG. 4 shows the obtained results.

As may be seen from FIG. 4, when the intensity of the orienting magnetic field is up to 5 kOe, the squareness ratio (Rs) increases in accordance with the intensity of the magnetic field. However, when the intensity of the orienting magnetic field exceeds 5 kOe, the increase in the squareness ratio (Rs) is small. When the intensity of the orienting magnetic field is 2 kOe or less, it is seen to be insufficient to orient alloy fine particles. The surface condition of the magnetic tape did not change when a magnetic field of high intensity was applied.

EXAMPLE 2

Figure 5:
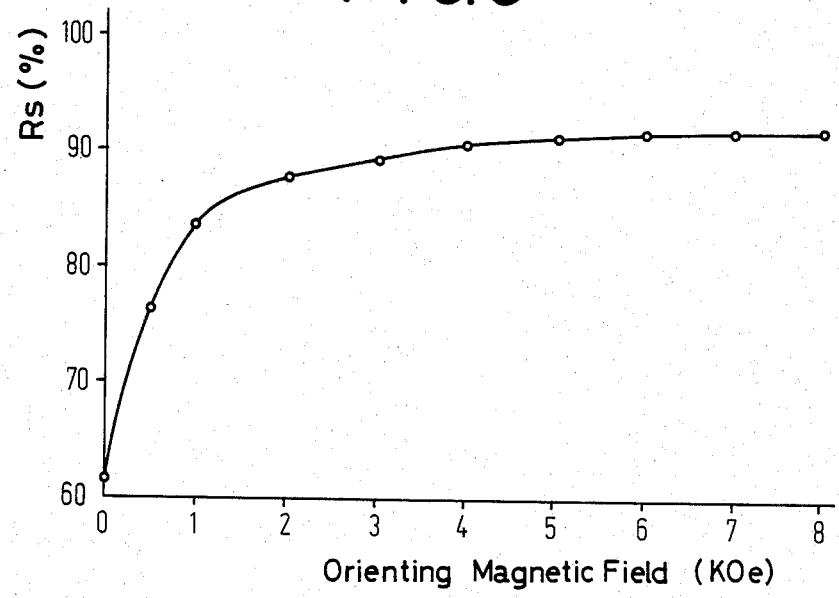
FIGS. 5 and 6 are graphs showing the squareness ratio as a function of the intensity of an orienting magnetic field and a magnetic field application time, respectively, of a magnetic tape obtained in Example 2.

The magnetic tape was oriented by the same procedures as those in Example 1 except that Co-containing γ-Fe₂O₃ fine particles (27 M²/g specific surface area, Hc=620 Oe) were used in place of the Fe-Ni-alloy. Changes in the squareness ratio (Rs) obtained when the intensity of the orienting magnetic field was changed are shown in FIG. 5. It is seen from FIG. 5 that Rs increases until the intensity of the orienting magnetic field reaches about 5 kOe. Almost no change was seen on the surface condition of the magnetic tape.

Figure 6:
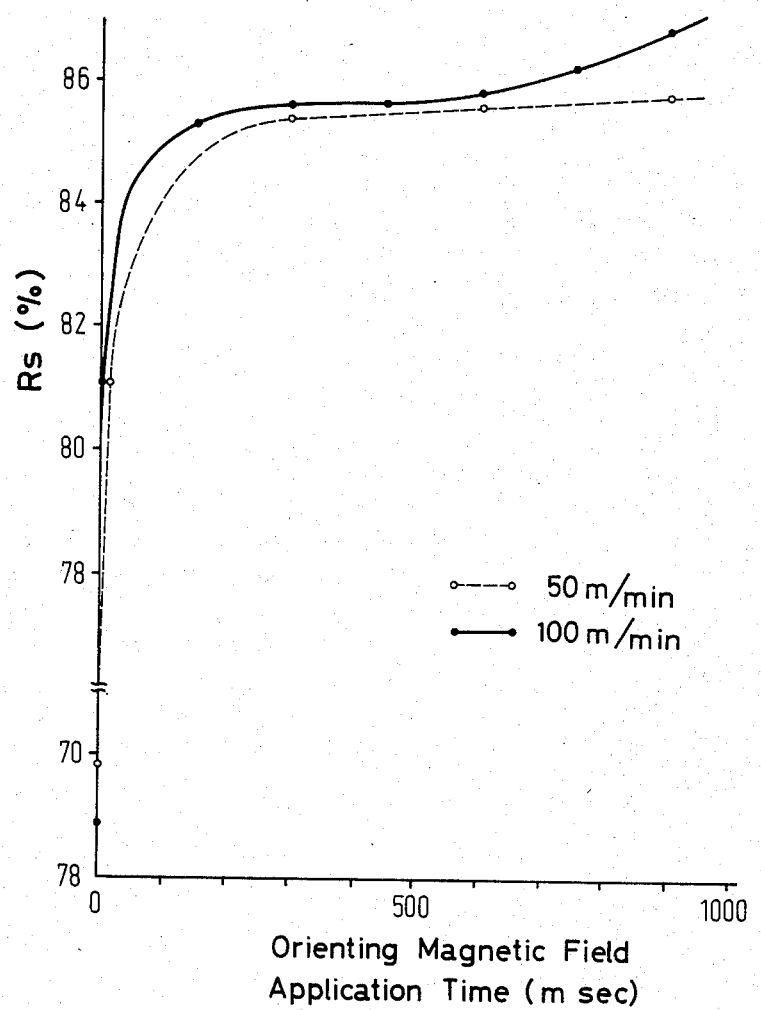

As in Example 2, the squareness ratio (Rs) of the magnetic tape oriented was measured when the intensity of the orienting magnetic field was 2 kOe and when the orienting magnetic field time was changed by changing the coating speed of the magnetic tape, that is, the passing speed of the magnetic tape through the slit. FIG. 6 shows the obtained results.

INDUSTRIAL APPLICABILITY

As has been described above, a conventional magnet can only apply a magnetic field of 3 kOe for 6 msec at maximum. A normally conductive solenoid magnet can only apply a maximum of about 2 kOe for about 300 msec. However, according to the present invention, an orienting magnetic field of higher intensity may be applied for a longer period of time by using a superconductive solenoid magnet. Since an orienting magnetic field of up to about 15 kOe can be applied over a period of 300 msec or longer, the squareness ratio (Rs) of Fe-Ni alloy ultra fine particles may be increased by about 10% and that of oxide-type fine particles may be increased by about 6%. As a result, a magnetic tape of the present invention has a residual magnetic flux density which is improved by about 10 to about 20% and has improved tape sensitivity and output in comparison with those of the conventional medium. According to the present invention, a permanent current need to be flown through a superconductive wire having a substantially zero electric resistance, and power loss due to heat generation is eliminated, so that the running cost of the cooling device or the like may be significantly reduced. Thus, the method of the present invention is advantageous from the viewpoint of energy conservation as well.

We claim:

1. A method for manufacturing a magnetic recording medium, comprising the steps of coating a magnetic paint consisting mainly of a needle-like magnetic powder and a binder on a nonmagnetic support to form a coating film; establishing a DC magnetic field of a predetermined direction in a slot about which a superconductive solenoid coil is formed, said coil having substantially zero electrical resistance by being exposed to an extremely low temperature, passing said nonmagnetic support with the magnetic paint thereon while said needle-like magnetic powder is still mobile through said slot, said DC magnetic field having an intensity of 1.5 to 15 kOe and is applied for at least 100 msec, thereby orienting said needle-like magnetic powder in said predetermined direction; and drying said coating film.

2. A method according to claim 1 characterized in that said needle-like magnetic particles comprise an oxide-type ferromagnetic powder having a specific surface area of 10 to 30 $m^2/g$.

3. A method according to claim 2, characterized in that the intensity of the DC magnetic field is 3.5 to 8 kOe.

4. A method according to claim 1, characterized in that said needle-like magnetic particles comprise a ferromagnetic metal powder having a specific surface area of 30 to 120 $m^2/g$.

5. A method according to claim 4, characterized in that the intensity of the DC magnetic field is 5 to 10 kOe.

* * * * *